United States Patent [19]

Matthews

[11] Patent Number: 4,494,177
[45] Date of Patent: Jan. 15, 1985

[54] ARTICULATED TASK LAMP

[75] Inventor: Charles Matthews, San Clemente, Calif.

[73] Assignee: Plan Hold Corp., Irvine, Calif.

[21] Appl. No.: 486,741

[22] Filed: Apr. 20, 1983

[51] Int. Cl.³ .............................................. F21V 21/18
[52] U.S. Cl. .................................. 362/402; 248/162.1;
362/33; 362/269; 362/285; 362/287; 362/396;
362/401; 362/413; 362/414; 362/417; 362/418;
362/419; 362/427; 362/431
[58] Field of Search ................. 362/33, 402, 401, 269,
362/285, 287, 396, 413, 414, 417, 427, 431, 418,
419; 248/162.1

[56] References Cited

U.S. PATENT DOCUMENTS

| 3,820,752 | 6/1974 | Oram | 362/427 |
|---|---|---|---|
| 4,165,530 | 8/1979 | Sowden | 362/427 |
| 4,280,172 | 7/1981 | Krogsrud | 362/427 |
| 4,328,536 | 5/1982 | Wallmark | 362/427 |

Primary Examiner—Stephen J. Lechert, Jr.
Attorney, Agent, or Firm—Poms, Smith, Lande & Rose

[57] ABSTRACT

An articulated task lamp for exemplary use as a counterbalanced drafting table lamp including pivotally interconnected base assembly, lower support arm, upper support arm, and lamp head, and counterbalance linkage operable within said lower support arm and base assembly and provided a novel connection to the upper support arm. The counterbalance linkage includes a torsion counterbalance spring in the base assembly having a force transmitting connection to a link member which is pivotally interconnected to a compensating link pivotally mounted intermediate its ends to the base assembly, the other end of said compensating link being pivotally connected to an elongated link member carried and operable within the lower support arm and having its other end pivotally connected to a crank member enclosed within a mid joint means providing a pivotal connection and force transmitting connection between the upper and lower support arms. The counterbalancing forces permit movement of the lamp head to any selected position over a drawing board surface and retain the lamp head in such selected position to provide desired illumination of a surface area of the drafting board. A joint structure for interconnecting adjacent ends of support arms in which the joint structure includes a cylindrical bearing and interconnection with cup shaped members carried by adjacent ends of the support arms for transmitting selected forces through the joint structure to effect counterbalancing of the lamp head.

11 Claims, 16 Drawing Figures

ARTICULATED TASK LAMP

BACKGROUND OF THE INVENTION

This invention relates to an articulated support structure for selectively positioning a lamp head over a drafting board to illuminate selected areas of the board to facilitate a draftsman's work. A drafting lamp structure is usually supported at the upper edge margin of a drafting board to occupy as little surface area of the board as possible. The articulated arm structure of such a lamp is required to reach all extremities of the board while maintaining a desired height above the board surface to minimize interference with the draftsman's hands, arms, and head while drawing. A standard board is usually about 37½ in vertical dimension and in lateral dimension may vary from 50 inches to 72 inches.

Prior proposed lamp structures have included various arrangements of articulated arms. One prior proposed lamp structure included telescopically arranged lamp supporting members pivotally connected to a base clamped on the edge of the board. Another prior proposed lamp support included pivotally interconnected parallelogram arm arrangements in which upper and lower support arms were each biased by independent springs extending from adjacent their pivotal connections to a point intermediate ends of the respective arms. Another prior proposed drafting board lamp supporting structure is disclosed in U.S. Pat. No. 2,299,251 and another embodiment thereof in U.S. Pat. No. 2,200,518. In each of these patents, a counterbalancing torsion spring is mounted in a base assembly adjacent the clamping of the base assembly to the drawing board. A linkage system is connected in force transmitting relation to the torsion spring, the linkage system extending along a lower support arm in generally spaced parallel exposed arrangement for connection at its upper end to the upper support arm. The linkage system is connected to a link pivoted on the base assembly and having an end extending externally of the base housing to transmit the biasing forces to the parallel link extending along the lower support arm.

In the above-mentioned prior proposed lamp supporting structures, the overall horizontal reach of the articulated arms extended from about 36" to 42" when the drafting board was in horizontal position and in vertical position extended only from about 16" to 24" from the top edge margin of the board because of the construction of the base assembly.

It should be noted that in some countries many draftsman prefer to draw with the board in horizontal or in an inclined position; whereas in other countries such as some of the European countries, draftsmen prefer to draw with the board in substantially vertical position. It thus becomes apparent that the support structure for a drafting table lamp should be capable of illuminating areas of a drafting board when the drafting board is not only in horizontal or inclined position, but also in a vertical position. The prior proposed lamp supporting structures mentioned above had only limited capability in satisfying the demands for stable fixed support of a lamp head adapted to selectively illuminate a drawing board surface in vertical, inclined, and horizontal positions of the drafting board.

SUMMARY OF THE INVENTION

The present invention relates to a counterbalanced articulated task lamp adopted for use as a drafting table lamp which overcomes many of the disadvantages of prior proposed constructions and which is adapted to provide maximum extension in horizontal through vertical positioning of the drafting board.

A main object of the present invention is to provide a counterbalanced articulated lamp supporting structure having maximum lamp extension in any position of the drafting board.

An object of the invention is to provide a counterbalanced lamp supporting structure for a drafting table lamp in which the lamp head is easily moved to a desired selected position above the drafting board and is retained in such position without random unwanted movement thereof until it is relocated by the draftsman.

Another object of the invention is to provide a drafting table lamp support structure in which the counterbalanced linkage system is concealed within the support arm means and base assembly to enhance the aesthetic appearance of the lamp support means.

Another object of the invention is to provide a drafting table lamp support means including articulated base assembly, lower support arm, upper support arm, and lamp head support so that the support means provides maximum flexibility and stability in moving and locating the lamp head in a desired selected position above a drawing surface.

A further object of the invention is to provide a counterbalanced lamp support structure including a counterbalancing linkage system which effectively utilizes counterbalancing forces provided by a torsion spring carried by the base assembly.

A still further object of the invention is to provide a drafting table lamp structure in which electric wiring for the lamp in the lamp head is passed through the articulated arm structure in a concealed novel arrangement which minimizes interference and wear on the electric wiring due to the articulated movement of the several parts of the lamp structure.

A more specific object of the present invention is to provide a counterbalanced lamp support means which includes a novel joint means or structure at the pivotal interconnection of upper and lower support arms to facilitate the transfer of counterbalancing forces to the upper support arm.

Another specific object of the present invention is to provide a lamp head for such a drafting table lamp support structure in which the lamp head is pivotally supported within a yoke, is counterbalanced, and includes means at the front accessible portion of the lamp head for readily positioning the lamp head and for operating the lamp.

Various other objects and advantages of the present invention will be readily apparent from the description of the following drawings in which an exemplary embodiment of the invention is shown.

DETAILED DESCRIPTION OF THE INVENTION

Figures 1, 2, 3:
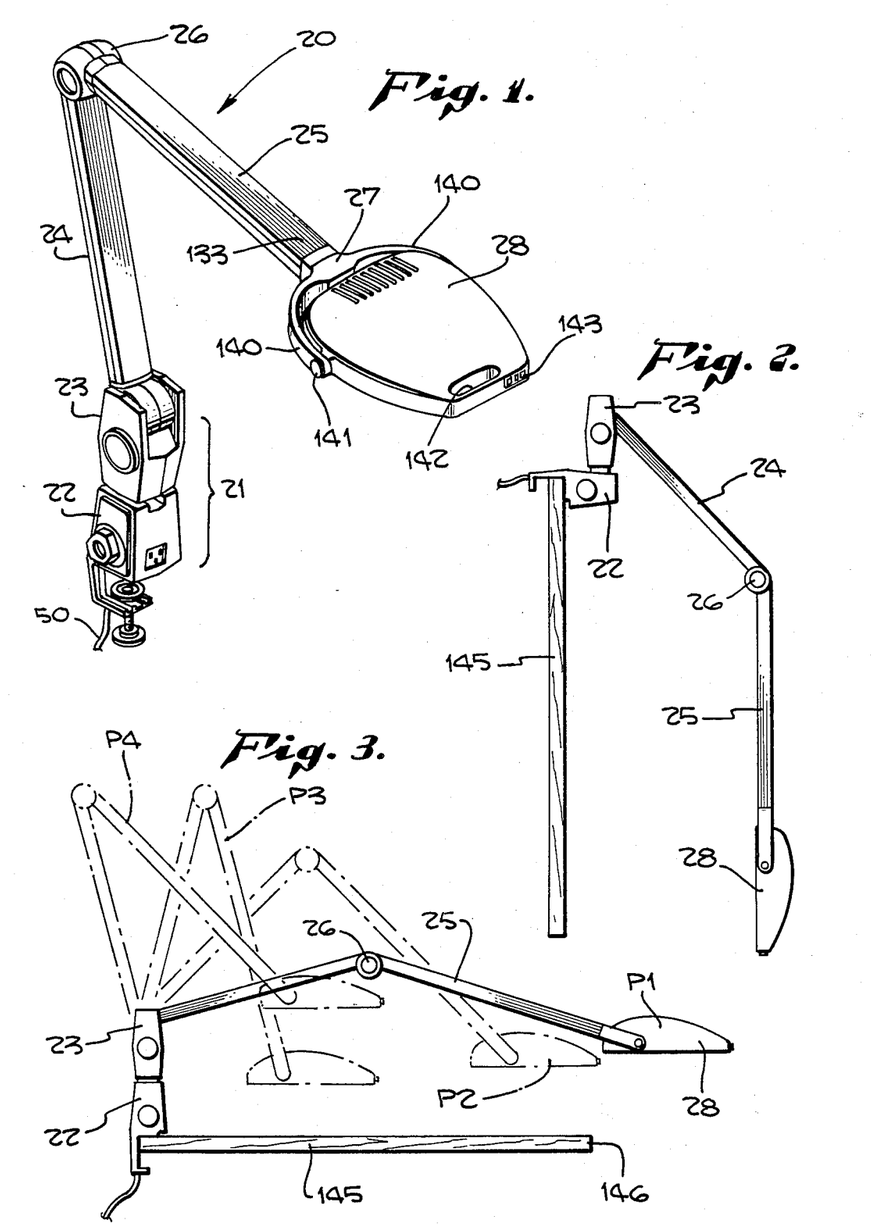
FIG. 1 is a perspective view of a counterbalanced support means for a lamp embodying this invention.
FIG. 2 is a schematic view showing a position of the lamp and its supporting means when the drafting board is in a vertical position.
FIG. 3 is a schematic view showing various balanced positions of the lamp and its support means when the drafting board is in a horizontal position.

A counterbalanced articulated task lamp embodying this invention generally indicated at 20 in FIG. 1 may comprise a base assembly 21 including a lower base portion 22 and an upper base portion 23 pivotally connected thereto for rotation about a vertical axis. Upper base portion 23 provides a pivotal connection to a lower support arm 24 which is pivotally connected to an upper support arm 25 through a joint means 26. The outer end of upper support arm 25 supports a pivotally mounted yoke 27 which pivotally carries a lamp head 28. FIGS. 2 and 3 illustrate several different positions of the lamp head utilizing the articulated support arms and base assembly as later described in more detail.

Lower base portion 22 may comprise a generally Z shaped cast member 30 having spaced horizontal rib-reinforced walls 31 and 32 providing a clamping zone 33 adapted to receive edge margins of a table top or drawing board 145 (FIGS. 2,3) for attachment thereto. The wall 31 is provided with a threaded clamp knob 34 having an engagement washer 35 for tightly frictionally gripping the board edge margin in the clamping zone 33 by tightening of the knob 34.

The clamp member 30 also includes a wall 36 extending upwardly from the top clamping wall 32 and having a return top wall 37 defining a lower base portion chamber 38. The chamber 38 is enclosed by opposed side plates 39 and by a back plate 40.

Within chamber 38 is pivotally mounted about a horizontal first axis a cylindrical member 42 provided with a side disc 43 having an arcuate slot therein 44 which receives a stud (not shown), having threaded engagement with a position adjustment knob 45. Back plate 40 is provided with an slot 47 adapted to receive the connecting means to the upper base portion 23 to permit movement of the upper base portion 23 thru 90° about the horizontal first axis and reception of portions thereof in slot 47. In any selected position of the upper base portion 23 in slot 47, knob 45 may be tightened to maintain such selected angular position, as for example that illustrated in FIG. 2 where upper base portion 23 is positioned at right angles to lower base portion 22.

Lower base portion 22 may include within its chamber 38 a ballast for the lamp which may be a fluorescent tube, a receptacle 48 for connection to an electric power source, and suitable space for making electrical connections by wire nuts as illustrated. An electric cord 50 enters chamber 38 through an opening 51 in clamp member 30. Side plates 39 and back plate 40 may be connected to the Z shaped member 50 by suitable arrangements of screws.

Upper base portion 23 is pivotally connected about a vertical second axis to lower base portion 22 by means of a threaded nipple 55 provided on cylindrical member 42. Nipple 55 extends through a set of bearing washers 56 and 57 and through an opening in the bottom wall 58 of a U-shaped upstanding bracket 59. The assembly may be retained by a snap ring lock member 60 which frictionally engages nipple 55 above the top surface of bottom wall 58 of the bracket 59. The tolerances are such that bracket 59 is readily rotatable about the vertical second axis with respect to the lower base portion 22.

The upper base portion 23 utilizes the U-shaped bracket 59 as a mounting means for a counterbalancing torsion type spring 62 having one external partially circular end 63 fixedly secured to a crossbar 64 extending between side walls 65 of bracket 59. The internal square bend end 66 of spring 62 is secured to a square section transverse shaft 67 which extends between walls 65 above transverse bar 64. The square section bar 67 provides a square fit to spaced spring crank members 68 provided on opposite sides of spring 62. The outer ends of crank members 68 are provided with three ports 70 adapted to receive a transverse rod 71 cooperable with a thrust link member 72. Link member 72 may be adjustably connected to crank member 68 by relocating bar 71 to a selected pair of aligned ports 70 in crank members 68. In assembly, the spiral torsion spring 62 may be wound to a selected tension to provide counterbalanced stable movement of lamp head 28 into a selected position above the drafting board 145.

Thrust link member 72 may be provided with link elements 72a having U-shaped end providing recesses 73 adapted to receive and pivotally cooperate with the transverse rod 71. Thrust link elements 72a may be bent at suitable angles and at their upper ends 74 may be pivotally connected at 75 to one end of a compensating link 76.

Compensating link 76 includes link elements 76a which are pivotally connected at 77 to radially inwardly extending arms 79 provided on the lower connector fitting 80 for connection to the lower support arm 24. Each arm 79 provides a pivotal connection at 81 to the upper end of upstanding bracket wall 65.

Each connector fitting 80, which includes radially inwardly extending arm 79, is formed so that the upper end of arm 79 is integral with a cylindrical wall 82 having an axis coinciding with the pivotal connection at 81. Each fitting has an upper portion 83 which extends into the lower end 84 of lower support arm 24.

The linkage and torsion spring assembly carried within the U-shaped bracket 59 may be enclosed within upper base portion housing members 87 (FIG. 5) which may include side walls 88 and end walls 89 suitably configured to house the U shaped bracket 65. It will be apparent from the configuration of the housing portions 87 that the lower support arm 24 is adapted to rotate through approximately 135° (FIG. 6) about pivot axis 81.

Lower support arm 24 may include a hollow, generally rectangular cross section, tube of suitable material and adapted to receive the upper reduced end portions 83 of the fittings 80 and positioned longitudinally with respect thereto by shoulders 93 formed on fitting 80. For decorative purposes, the edges of the tubing of the lower support arm 24 may include a longitudinally extending groove 94 into which may be fitted a trim strip 95 secured thereto by suitable screws.

The upper end 97 of lower support arm 24 may also receive therewithin a reduced portion 98 of an upper hollow cup-shaped member 100 which provides one side of the mid-joint structure or means 26 and forms a fixed connection to the upper end of the lower support arm 24.

Similarly, on the opposite side of mid-joint structure 26 an identical hollow cup-shaped member 100' (like elements are given a prime sign) is provided with an extension 98' received within the upper support arm 25 constructed of rectangular hollow section tubing as described for lower support arm 24. Each of the mid-joint members 100, 100' include internal inwardly extending hubs 101, 101' forming an axial recess 102 adapted to receive ends of a nut and bolt assembly 103 for securing the mid-joint 26 structure in assembly. Radially outwardly of the internal hubs 101, 101', joint members 100, 100' include a plurality of angularly spaced inwardly projecting studs 104, 104'. Four such studs 104, 104' are shown. Adjacent the internal marginal portion 105, 105' of the mid-joint means may be provided a plurality of axially extending ribs 106, 106' of generally triangular shape. Internal edges 107, 107' of each of the ribs 106, 106' is spaced inwardly from the outer edge 108, 108' of the members 100, 100'.

A cylindrical bearing ring 110 is positioned between the mid joint members 100, 100' and is provided with a rabbeted circumferential edges 111 adapted to receive edges 108, 108' of the members 100, 100'.

The cylindrical bearing ring 110 is provided on one side thereof with a plurality of spaced pairs of projections 114, each pair of projections providing a recess 115 adapted to receive a rib 106. Cylindrical bearing 110 in assembly is interlocked with member 100, held against rotation relative thereto, and thus is in fixed relation with the lower support arm 24. The opposite side of ring bearing 110 at its rabbeted edge 111 provides a circular bearing surface adapted to cooperate with edge margin 108' of the member 100' which is attachable in fixed relation to upper support arm 25.

Figures 9, 10, 11:
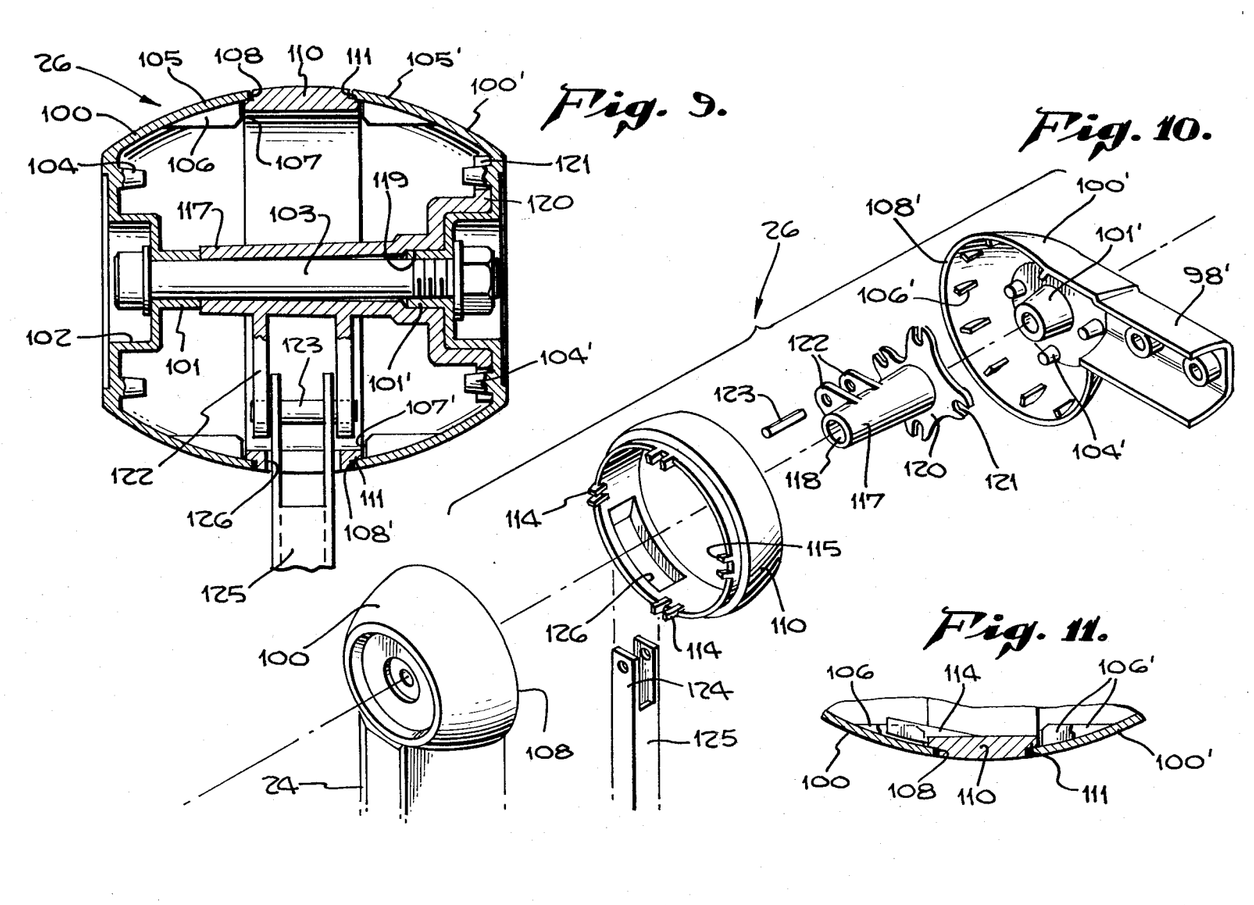
FIG. 9 is a transverse sectional view bisecting the joint means between the upper and lower support arms shown in FIG. 1 as indicated by line IX—IX of FIG. 7.
FIG. 10 is an exploded view of FIG. 9.
FIG. 11 is a fragmentary sectional view of a circumferential portion of FIG. 9 illustrating interlocking of the cylindrical bearing ring with one of the cup shaped members connected to one of the support arms.

Means for driving the cup-shaped member 101' in relative rotation with respect to cylindrical bearing 110 may comprise a drive sleeve member 117 having a through bore 118 adapted to be sleeved over the assembly nut and bolt 103. Drive member 117 includes an internal cylindrical recess 119 adapted to receive hub 101'. A radially outwardly extending base flange 120 is provided with a plurality of angularly spaced recesses 121 adapted to receive and engage the spaced studs 104' on member 100' to fixedly interlock the drive member 117 with member 100'. Drive member 117 also includes radially extending spaced ported crank arms 122 adapted to provide a pivotal connection through pin 123 with the upper end 124 of link member 125. As noted in FIGS. 8 and 10, the upper end 124 is receivable within a rectangular shaped opening 126 provided in ring bearing 110 so that a pivotal connection can be made between the link member 125 and crank arms 122 on the drive member 117.

Figures 7, 8:
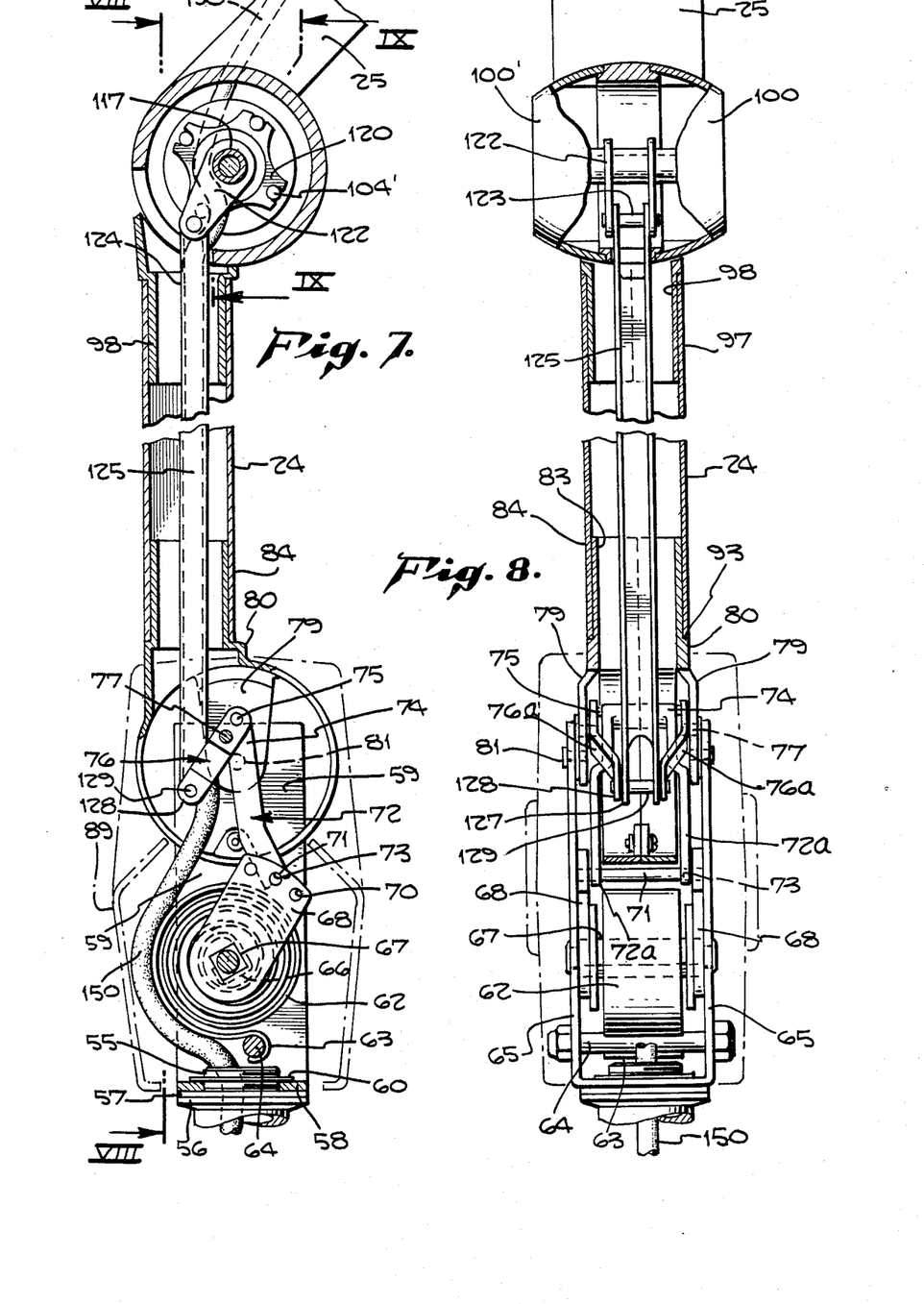
FIG. 7 is a sectional view taken generally in a vertical plane bisecting the lower arm and upper base portion to illustrate the internal linkage means.
FIG. 8 is a sectional view taken in the planes indicated by lines VIII—VIII of FIG. 7.

Link member 125 has a lower end 127, FIG. 7, connected pivotally to end 128 of the compensating link 76 by means of a suitable pin 129.

Figure 13:
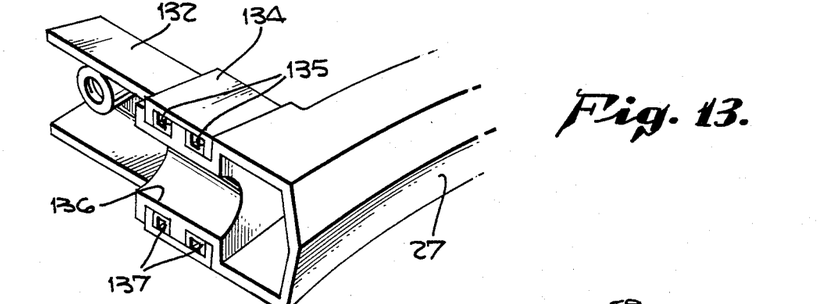
FIG. 13 is a fragmentary sectional view illustrating the pivotal connection between the lamp head yoke and the end of the upper support arm.

Upper support arm 25 comprises a hollow rectangular cross section rigid tubular member similar to tubular member 24 and may be provided with longitudinally extending grooves 130 adapted to receive therewithin trim strips 131 for decorative purposes. At the outer end of upper support arm 25 may be pivotally connected yoke 27. FIG. 1, 13 The pivotal connection includes an insert member 132 receivable within the outer end 133 of arm 25 and providing a housing 134 adapted to fit over a pair of bearing recesses 135 provided on an extension 136 of the internal central portion of the yoke arm 27. Bearing rings 137 receivable in the recesses 135 permit the yoke 27 to be rotated about the longitudinal axis of the upper support arm 25.

Outer ends 140 of the yoke arms are pivotally connected at 141 to lamp head 28 which carries therewithin a suitable light source such as a circular fluorescent tube or a suitable incandescent lamps. The outer end of head 28 includes a hand hold opening 142 for positioning lamp head 28 and the support means in desired relation with a drawing board surface. Adjacent hand opening 143 are provided suitable switch means 144 for operating the light source.

Figures 4, 6:
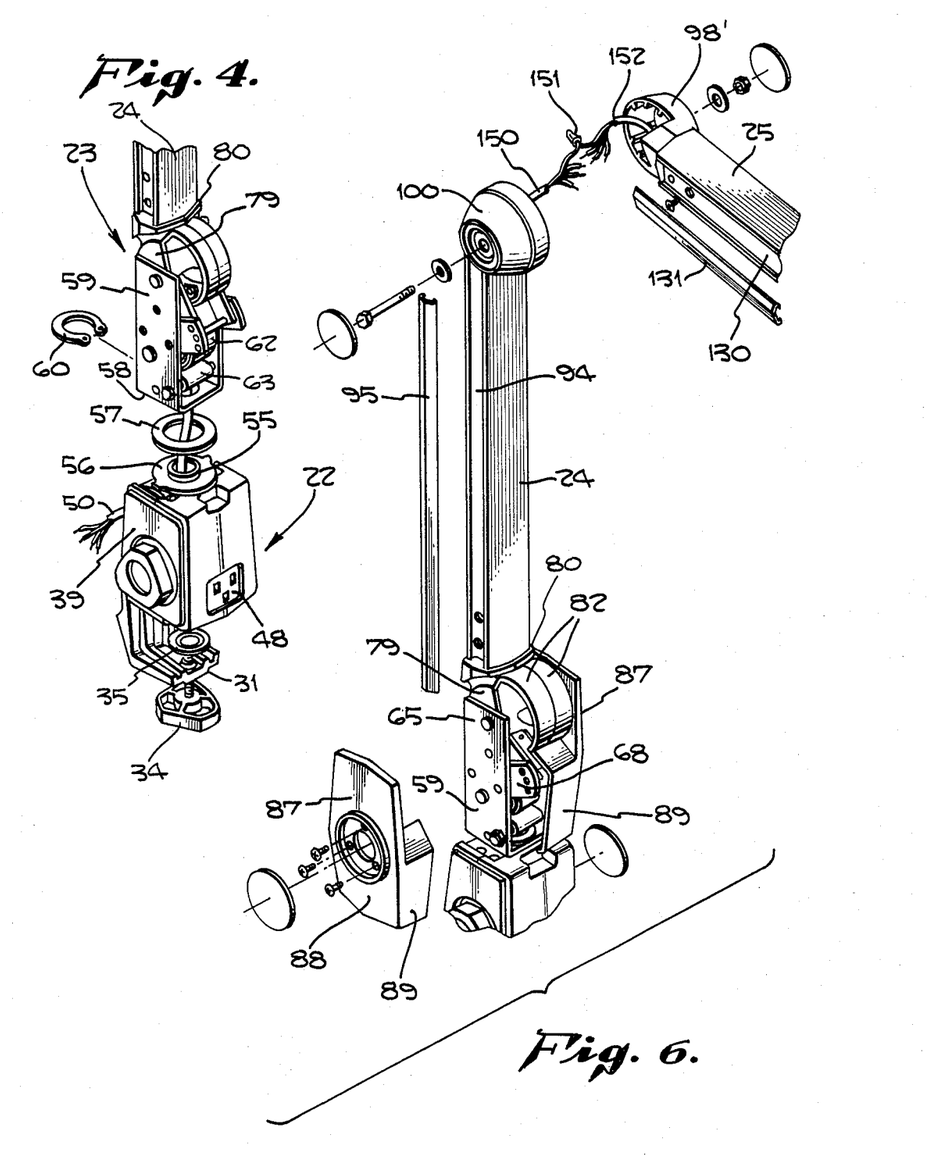
FIG. 4 is an enlarged fragmentary perspective view of the base means for the counterbalanced support with the cover plate for the upper base portion removed and with the pivotal connection of the upper and lower base portions in part exploded relation.
FIG. 6 is a perspective view, partially exploded, of the counterbalanced support means for a lamp shown in FIG. 1, one of the cover plates for the upper base portion being shown in exploded relation, trim plates for the lower and upper arms being shown in exploded position, and the upper arm being shown in exploded relation to the upper end of the lower arm.
Figure 5:
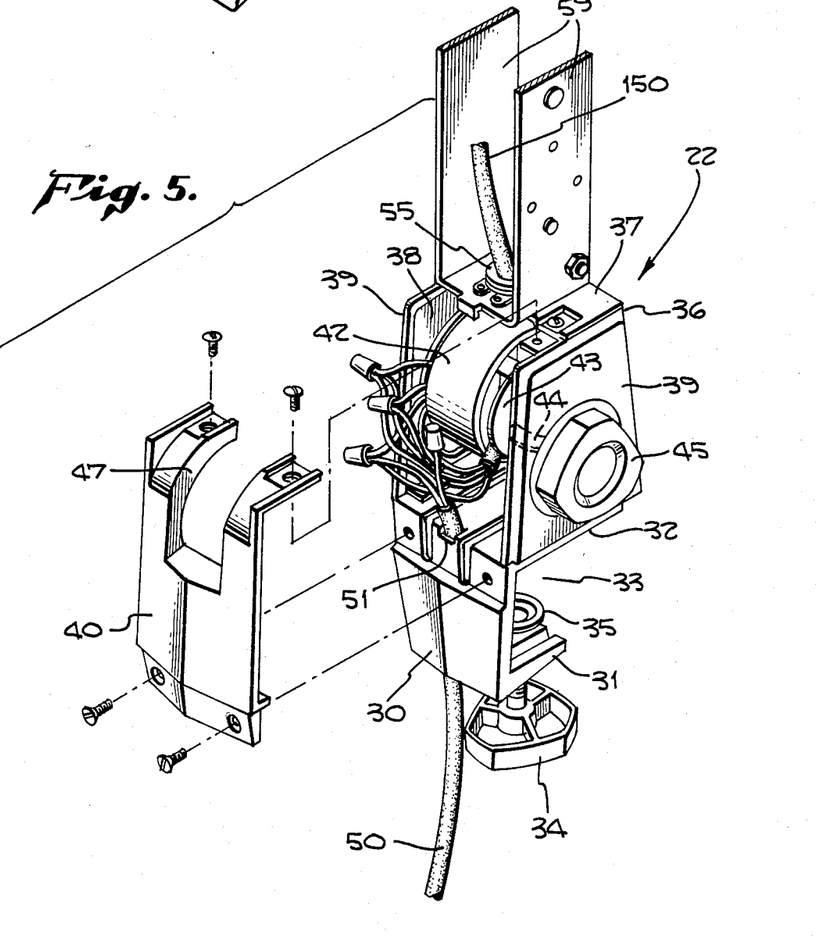
FIG. 5 is a partially exploded perspective view of the lower base portion of the base means shown in FIG. 4.

Wiring of the counterbalance support means and lamp is facilitated by the above described construction and includes passage of the wire line 50 into the lower base portion chamber 38 as previously described through opening 51, FIG. 5, for interconnection with wire nuts to leads from the ballast carried in the lower base portion 22. Wire from the ballast extends upwardly through the nipple 55 as indicated in FIG. 4, the wire 150 extending upwardly between the walls of the U-shaped bracket, FIG. 6, and then upwardly through the hollow link member 125 for entry into the mid-joint structure 26. At the mid-joint structure, the end of wire 150 may be connected by a wire nut 151 to a wire 152 which extends through the hollow upper support arm 25 to and through the pivotal connection of the yoke 27 to arm 25. The wire is then directed through one of the yoke arms 140 for entrance into lamp head 28 through one of the pivotal connections 134. Suitable wire connections are made with switch means 143.

In operation of the counterbalance support means described above, it will be apparent that the base portion 22 may be clamped to the edge margin of a horizontal drafting board or table top 145, FIG. 3, board 145 being adapted to be positioned in inclined or even a vertical position as indicated in FIG. 2. Further consideration of FIGS. 2 and 3 show that when the drawing board is in horizontal position that, in clamped position, the base assembly 21 permits the upper and lower base portions 23 and 22 to be vertically aligned and to thereby position the pivotal axis of the lower support arm with the upper base portion a fixed distance above the surface of the board 145. Thus the articulated support arms structure 24 and 25 and lamp head 28 are generally offset from the board 45 to provide initial clearance of the lamp head from the drawing board surface in the event the arms are horizontally extended. Such horizontal or approximately horizontal extension as shown in FIG. 3 positions lamp head 28 beyond the front edge 146 of the board 145. Such position is indicated at P1. An intermediate position indicated at P2 is provided by pivotally moving upper support arm 25 relative to lower support arm 24 to form an included angle of approximately 90° and by moving the lower support arm 24 about its pivotal connection to the upper base assembly 23 to form an included angle therewith of about 45°. Further movement of lamp head 28 towards the base assembly 21 decreases the included angle between the articulated upper and lower support arms and enlarges the included angle between the lower support arm and the upper base assembly 23. The lamp head 28 may retain its generally horizontal disposition by its pivotal connection about the ends of yoke 27. The orientation of lamp head 28 with respect to the board may be further modified by pivotally moving yoke 27 about its pivotal connection to the end of upper support arm 25 in order to create a desired direction and distribution of light on the drawing board surface.

It will be apparent from considering FIG. 3 that when the lamp head is in the position indicated by P1 the weight of the lamp head is supported at a substantial distance from the base assembly 21, and that the length of the moment arms acting about pivotal connection at 81 will be maximized. When the lamp head 28 is located at the P3 and P4 positions, the moment arm of the weight of the lamp head acting about the pivotal axis 81 is substantially less.

The condition of the linkage system to counterbalance the several positions of the lamp head 28 as illustrated in FIG. 3 is best illustrated in FIGS. 12a–12d. After having selected a desired position for the end of the thrust link member 72 to engage the spring crank pin 71 in a selected pair of ports 70 of the crank arms to obtain the desired spring torsion, it will be noted that upper support arm 25 has actuated the crank arm 122 at the mid-joint 26 to cause the compensating link 76 to pivot about its pivotal axis 77 so that much large moment arm will be opposed by the spring force acting about its approximately maximum moment arm. whose horizontal force component has reacted its maximum. As the lamp head 28 is moved to its several different positions, the variations in moment arm lengths are compensated by the arrangement of the linkage system involving the link member 125, the compensating link, and the thrust link 72. It will be apparent from considerations of FIGS. 12a–12d that movement of the lamp head to different positions not only creates a different relation between the links in the linkage system so that the force moment will cause varying degrees of rotation of the spring crank arm 68 to impart varying counterbalancing forces to stabilize and retain the lamp head in a desired selected position.

Figure 12:
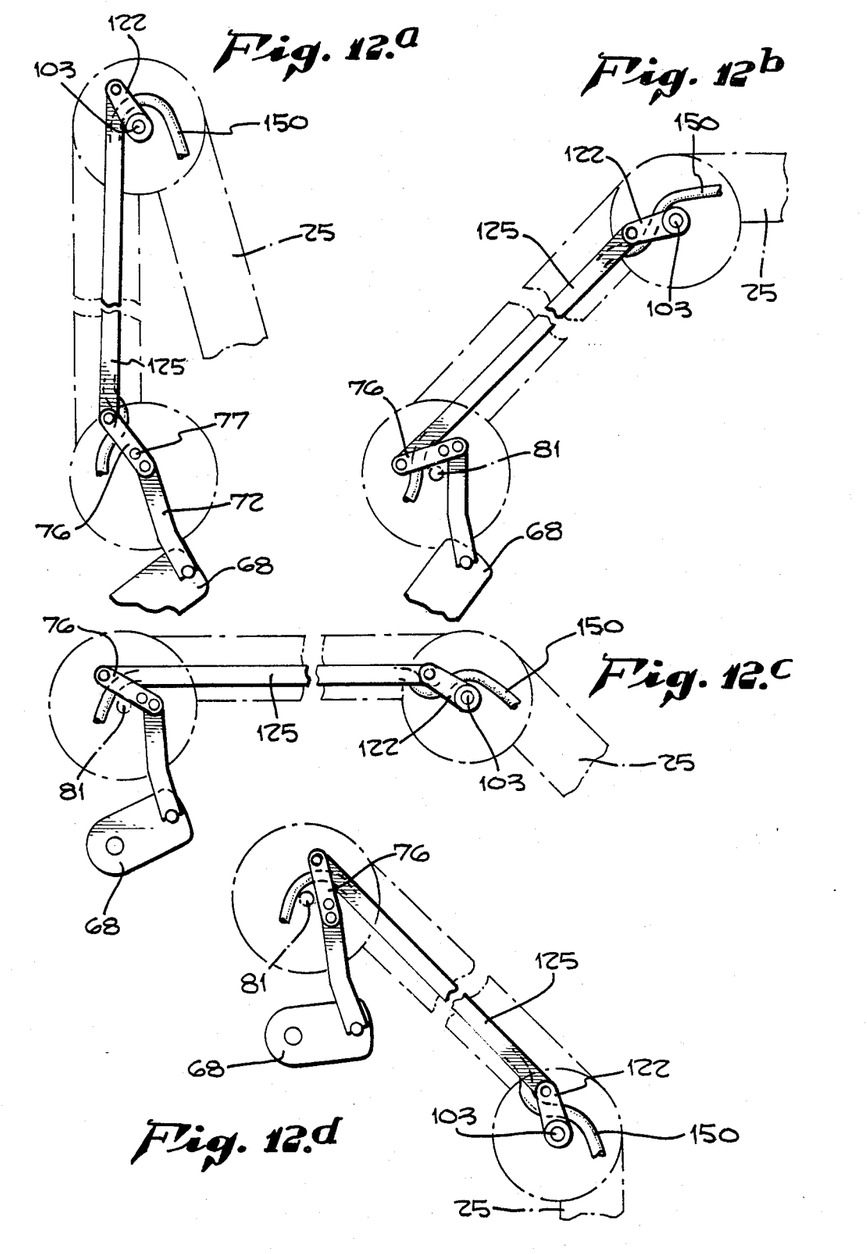
FIGS. 12a, 12b, 12c and 12d are schematic views illustrating the support means in different positions and the position of the counterbalancing link means carried by said support means.

It should be noted that when the drawing board 145 is in vertical position as shown in FIG. 2 that the upper base assembly 23 may be rotated through 90° to an upstanding position and that in such position the articulated support arms 24 and 25 prevent downward extension of the lamp head 28 to a position generally opposite the lower margin of the board 145. FIG. 12d illustrates the relative position of the links in the linkage system and the crank arm 68 to counterbalance the lamp head in such position. The thrust link 72 and the compensating link 76 in this position provide a minimal moment arm between the pivotal connections 77 and 75. However, the crank arm 68 has been differently positioned to exert a greater spring force.

By proper selection of the ports 70 into which the pin 73 is supported, the spring torsion force may be adjustably regulated as transmitted to the thrust link 72 so that effective counterbalancing forces may be utilized to maintain the lamp head in selected position.

Lamp head 28 is counterbalanced about its pivotal connection 141 to the yoke 127 so that as the relation of the lamp head changes with respect to the axis of upper support arm 25 the lamp head 28 will retain its selected position. It should be noted that the lamp head and the articulated arms may be readily operable by moving the lamp head by the use of one hand in the hand hold 142 and at the same time the switch buttons are readily accessible to fingers of that one hand to provide illumination of the drawing board surface. The thickness of the lamp head 28 is sufficient to retain therewithin a circular or other type of fluorescent tube or may retain therewithin an incandescent lamp bulb. The depth of the lamp head is substantially less than the length or width of the lamp head and as a result provides a relatively low profile which minimizes interference with the draftsman and which is aesthetically pleasing.

The mid-joint means 26 provides a structure for positive novel transmission of the counterbalancing forces to the upper support arm 25 and the arrangement of the cylindrical bearing ring and the cup shaped housing members therewith provides a force transmitting joint of novel structure. Both cup shaped housing members 100, 100' are identical and thus facilitate assembly of the mid joint with the adjacent ends of the upper and lower support arms.

The articulated task lamp described above, in the exemplary form of a counterbalanced drafting table lamp, embodies features which will make said lamp useful as a general work light; that is, for quality control product inspection, for general manufacturing and tooling purposes, for electrical and mechanical assembly, and various other industrial, engineering, medical and dental purposes.

Various modifications and changes made in the structure described hereinabove which may come within the spirit of this invention and all such changes and modifications coming within the scope of the appended claims are embraced thereby.

What is claimed is:

1. Counterbalanced support means for a drafting table lamp in which a base means is provided with a lower base portion adapted to be clamped to a drafting table and with an upper base portion pivoted on the lower base portion about first and second axes, counterbalance means in the upper base portion including a crank member pivoted about a third axis transverse to one of the first and second torsion axes, a torsion spring means biasing said crank member, a thrust link member connected to one end of the crank member, a lower tubular support arm pivotally mounted on the upper base portion about a fourth axis, and an upper support arm pivotally connected about a fifth axis to the lower support arm and carrying a lamp provided with a pivotal connection to the upper support arm, comprising in combination:

a compensating link in said upper base portion having a pivotal connection at one end to one end of said thrust link member;

said compensating link having a pivotal connection between its ends to said upper base portion;

a link member having a pivotal connection to the other end of said compensating link and extending within and through said tubular lower tubular support arm;

said pivotal connection of said upper support arm to the end of said lower support arm about said fifth axis comprising;

a crank arm pivoted about said fifth axis and having a pivotal connection to the upper end of said link member;

said crank arm having a driving connection acting about said fifth axis to the upper support arm for transmitting counterbalancing forces from the torsion spring means through the compensating link, and link member to the upper support arm.

2. Counterbalanced means as stated in claim 1 wherein said pivotal connection between said upper and lower support arms includes a joint housing structure, having a cylindrical bearing ring.

3. A counterbalanced means as stated in claim 2 wherein said cylindrical bearing ring includes means for interlocking engagement with means on the upper end of said lower support arm.

4. A counterbalancing means as stated in claim 1 wherein said pivotal connection between said upper and lower support arms includes a hollow sleeve carrying said crank arm, said hollow sleeve having a base flange provided with means for engagement with means carried by the adjacent end of said upper support arm.

5. Counterbalanced means as stated in claim 1 wherein said link member is provided with a longitudinal passageway for its length, and electric wiring extending through said passageway, passing adjacent said crank arm and over said fifth axis, and through said upper support arm for connection to said lamp, said wiring passing through said base means for connection to a power source.

6. A counterbalance means as stated in claim 1 including a yoke member pivotally mounted at the free end of said upper support arm;

a lamp head pivotally connected to the extremities of said yoke member, said lamp head having a height or thickness substantially less than its width and length.

7. A counterbalance means as stated in claim 6 wherein said lamp head is provided with a finger hold means externally of the ends of the yoke member;

and operable switch means adjacent said finger hold means.

8. Counterbalance support means for a lamp in which a base means is provided with counterbalance means, a lower arm is pivoted to said base means, and an upper arm carries the said lamp at the outer end of the upper arm; the combination of:

means for transmitting the counterbalancing forces of the counterbalance means in the base means to said upper arm comprising:

means for pivotally interconnecting the upper end of the lower arm with the adjacent inner end of the upper arm about a common axis, said interconnecting means including a housing part on said inner end of the upper arm and a housing part on the upper end of the lower arm, a cylindrical ring between said housing parts to provide relative rotation thereof;

a crank arm carried by one of said housing parts and interlocked therewith for rotation therewith; and a link member having one end pivotally connected to said crank arm and its other end operatively connected to said counterbalance means.

9. In a counterbalance support means as stated in claim 8 including means for interlocking said cylindrical bearing ring with one of said housing parts.

10. In a counterbalance support means as stated in claim 8 including a compensating link pivotally connected to one end of said link member at said base means, said compensating link being pivotally interconnected intermediate its ends to said base portion, the other end of said compensating link being operatively pivotally connected to said counterbalance means.

11. In a counterbalance support means as stated in claim 8 wherein said link member includes a longitudinal passageway having an opening at said base means and having an opening at said cylindrical bearing ring, and electric conduit means extending through said passageway, through said bearing ring, and through said housing parts and said upper arm for connection to said lamp.

* * * * *